United States Patent
Dewar

(10) Patent No.: US 7,410,353 B2
(45) Date of Patent: Aug. 12, 2008

(54) EDGE GATED INJECTION MOLDING APPARATUS

(75) Inventor: Neil Dewar, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 261 days.

(21) Appl. No.: 11/253,585

(22) Filed: Oct. 20, 2005

(65) Prior Publication Data

US 2006/0082031 A1    Apr. 20, 2006

Related U.S. Application Data

(60) Provisional application No. 60/619,924, filed on Oct. 20, 2004.

(51) Int. Cl.
*B29C 45/23* (2006.01)
(52) U.S. Cl. ...................... 425/564; 425/566
(58) Field of Classification Search ................ 425/562, 425/563, 564, 565, 566
See application file for complete search history.

(56) References Cited

U.S. PATENT DOCUMENTS

| | | | |
|---|---|---|---|
| 4,212,624 A | 7/1980 | Ando et al. |
| 4,345,892 A | 8/1982 | Schulte et al. |
| 5,324,190 A | 6/1994 | Frei |
| 5,324,191 A | 6/1994 | Schmidt |
| 5,474,439 A | 12/1995 | McGrevy |
| 5,851,571 A | 12/1998 | Manner |
| 6,027,328 A | 2/2000 | Herbst |
| 6,245,279 B1 | 6/2001 | Kalemba |
| 7,063,525 B2 * | 6/2006 | Dufner ................ 425/564 |
| 2003/0224086 A1 | 12/2003 | Olaru |
| 2004/0009259 A1 | 1/2004 | Manner |
| 2004/0151799 A1 | 8/2004 | Gellert et al. |

FOREIGN PATENT DOCUMENTS

| | | |
|---|---|---|
| EP | 0 186 413 A1 | 7/1986 |
| EP | 0 447 573 A1 | 9/1991 |
| JP | 54-076656 A | 6/1979 |
| JP | 58-005238 A | 1/1983 |
| JP | 11-277573 | 10/1999 |
| JP | 2002-283410 A | 10/2002 |
| KR | 10-0296969 B1 | 5/2001 |
| WO | WO 03/076163 A1 | 9/2003 |

* cited by examiner

*Primary Examiner*—Tim Heitbrink
(74) *Attorney, Agent, or Firm*—Medler Ferro PLLC

(57) ABSTRACT

An edge gated injection molding apparatus includes a manifold having a manifold channel for receiving a melt stream of moldable material under pressure. A nozzle is coupled to the manifold and a nozzle melt channel of the nozzle receives the melt stream from the manifold channel. A mold cavity communicates with the nozzle melt channel of the nozzle and receives melt through a mold gate. The mold gate is located at an edge of the mold cavity. A chamber receives melt from the nozzle channel and communicates with the mold cavity through the mold gate. A portion of the chamber is located forward of the mold gate. A valve pin is slidable through the nozzle channel from a first position in which the mold gate is open to a second position in which an outer side surface of the valve pin blocks the mold gate.

15 Claims, 11 Drawing Sheets

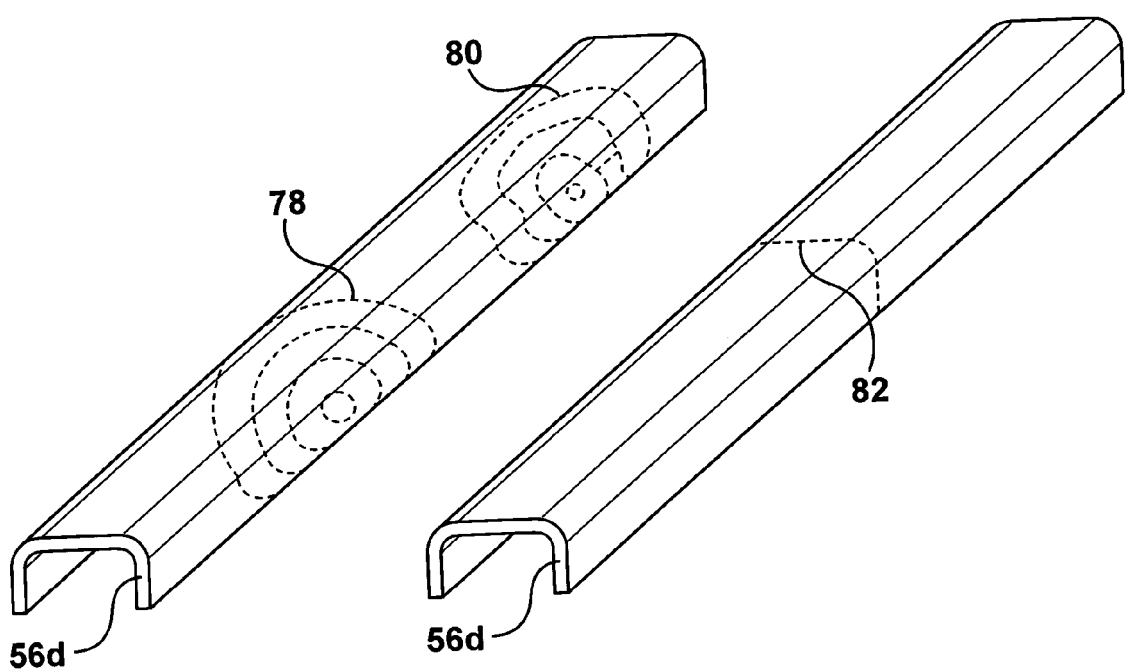
FIG. 11A  FIG. 11B

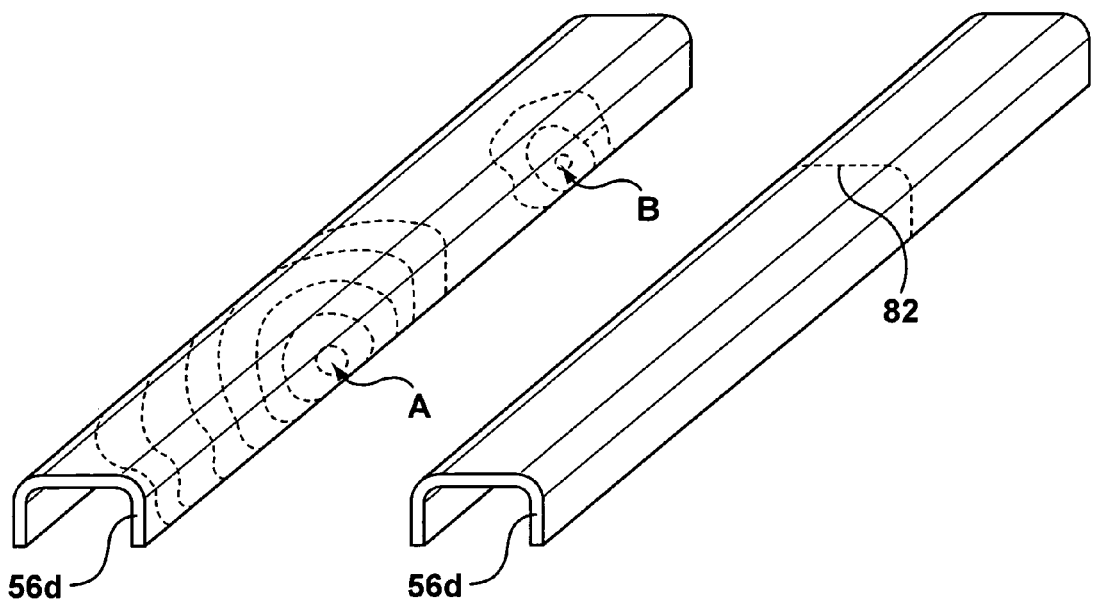
FIG. 12A  FIG. 12B
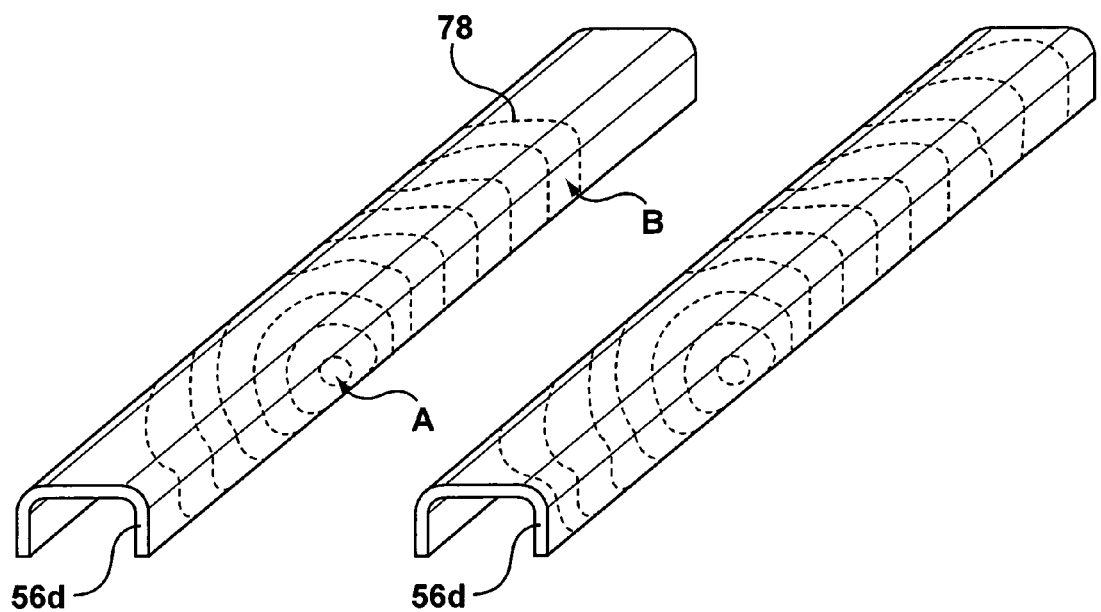
FIG. 13A  FIG. 13B

EDGE GATED INJECTION MOLDING APPARATUS

CROSS-REFERENCE TO RELATED APPLICATION

This application claims the benefit of U.S. Provisional Application No. 60/619,924, filed Oct. 20, 2004, which is incorporated by reference herein in its entirety.

FIELD OF THE INVENTION

The present invention relates generally to an injection molding apparatus and, in particular to an edge gating method and apparatus.

BACKGROUND OF THE INVENTION

Edge gating is well known in the art of injection molding and generally refers to a process for molding a part in which the mold gate is located at an edge or a side of a mold cavity, rather than at the center thereof. In general, the axis along which melt flows into the mold cavities in an edge gating system is at an angle to the main axis of the nozzle. Edge gating is typically used in applications where part geometry dictates that the gate cannot be located at the center of the part or in applications where it is desirable to hide the vestige left by the mold gate on the part. A typical application for edge gating is a molded syringe, which is generally a thin tube, for medical applications.

In a typical edge gated system, a plurality of cavities are located in a cooled cavity plate around a heated nozzle. Thermal gated mold gates are selectively openable to allow melt to flow from the nozzle into the cavities through heating and cooling of the mold gates. Thermal gating requires a heater to be provided along the nozzle and as near to the tip of the nozzle as possible.

There are applications where the mark, or the vestige, left on the edge or lateral gated molded part is not acceptable or should be almost invisible for aesthetic or functional reasons.

Hot runner nozzles for edge gating applications using mechanical means to open and close a mold gate, such as a movable valve pin, rather than thermal means are also known. Valve gated nozzles are presumed to provide a better control of the flow of material through the mold gate. However, there is still a need in the art for edge gating apparatus and methods that provide improved molded parts.

SUMMARY OF THE INVENTION

The present invention is an injection molding apparatus having a manifold for receiving a melt stream of moldable material under pressure and for distributing the melt stream to a hot runner nozzle. The nozzle is in fluid communication with a mold cavity through a mold gate, which is situated along an edge of the mold cavity. The nozzle includes a nozzle melt channel and a recess at a forward end thereof. The recess receives the melt stream from the nozzle channel and fluidly communicates the melt stream to the mold cavity through the mold gate. The recess has a forward portion that at least partially extends forward of the mold gate. The nozzle further includes a valve pin having a tip portion, wherein the valve pin is slidable within the nozzle channel from a first position in which the mold gate is open to a second position in which an outer side surface of the valve pin blocks the mold gate. In an embodiment in the first position, the valve pin is retracted and the valve pin tip portion is unseated from the recess forward portion, and in the second position, the valve pin is extended and the valve pin tip portion is seated in the recess forward portion. In another embodiment, the valve pin is retracted in the closed position with the valve pin tip portion unseated from the recess forward portion, and the valve pin is extended in the open position with the valve pin tip portion seated in the recess forward portion.

According to another embodiment of the present invention, the melt stream is not introduced into the mold cavity via a mold gate but instead the mold cavity is partially formed by a molding surface on a forward side surface the valve pin. As such, when the valve pin is in a position to stop the melt stream from reaching the mold cavity, in either an extended or retracted position as the case may be, the molding surface of the valve pin forms a portion of the mold cavity.

Another embodiment of the present invention is a method for injection molding a mold cavity having at least two mold gates located along an edge of the mold cavity. The method includes providing a manifold for receiving a melt stream of moldable material from a source and delivering the melt stream to a first nozzle channel of a first nozzle and a second nozzle channel of a second nozzle. The first nozzle channel having a first valve pin with a side surface for selectively blocking a first mold gate and the second nozzle channel having a second valve pin with a side surface for selectively blocking a second mold gate. The method includes opening the first mold gate by moving the first valve pin and injecting the melt from the first nozzle channel through the first mold gate into a mold cavity. After the melt stream from the first mold gate is allowed to spread within the mold for a certain time period, the method then includes opening the second mold gate by moving the second valve pin and injecting melt from the second nozzle channel through the second mold gate into the mold cavity. Accordingly, the second mold gate is opened after the first mold gate, such that the first and second gates are opened consecutively.

BRIEF DESCRIPTION OF THE FIGURES

Embodiments of the present invention will now be described more fully with reference to the accompanying drawings in which like reference numerals indicate similar structure. The drawings are not to scale.

FIGS. 11A, 11B, 12A, 12B, 13A and 13B are isometric views of a mold cavity of FIG. 10.

DETAILED DESCRIPTION OF THE INVENTION

Figure 1:
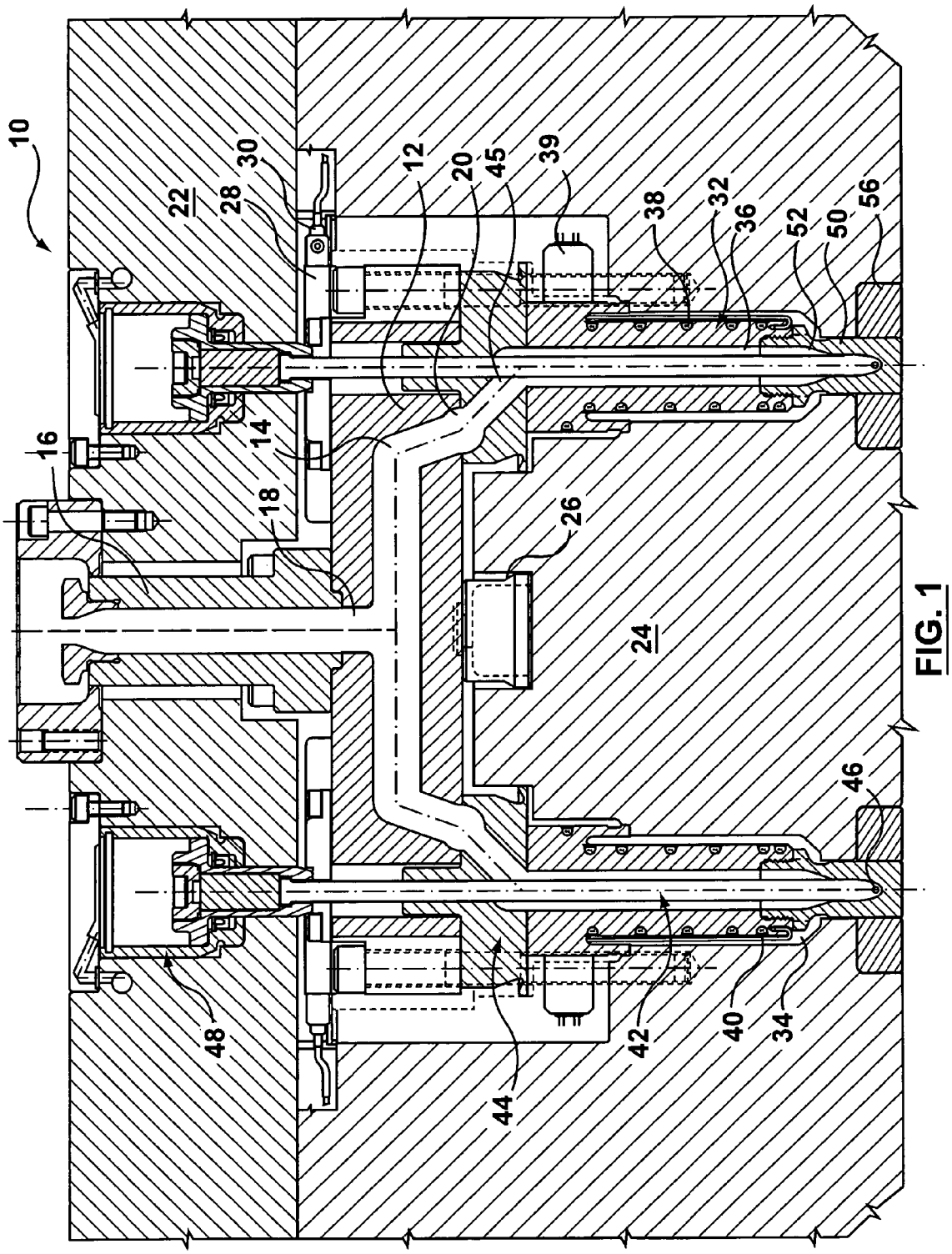
FIG. 1 is a front view partly in section of an injection molding apparatus according to an embodiment of the present invention.
Figure 2:
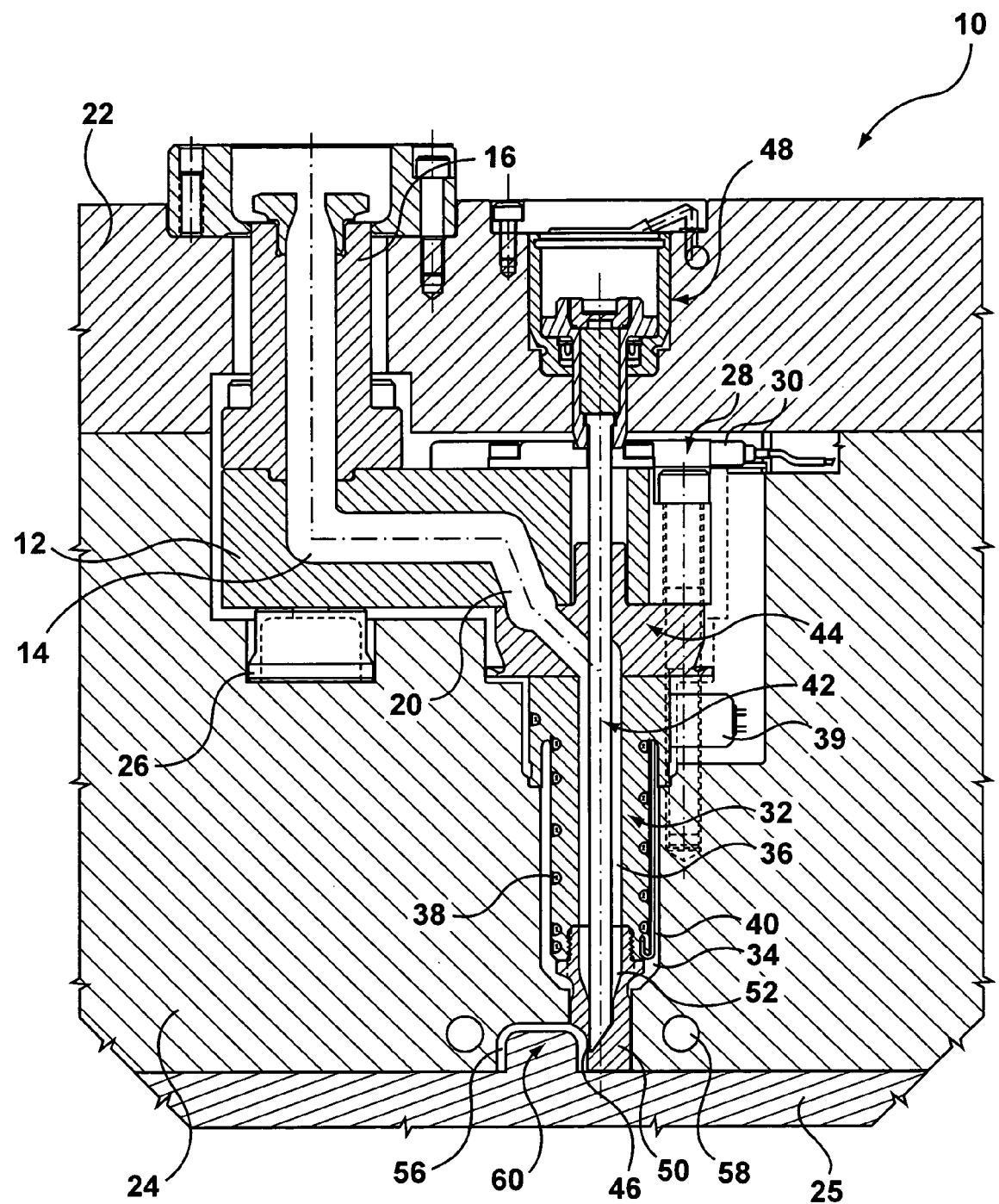
FIG. 2 is a side view of the injection molding apparatus of FIG. 1.

Referring to FIGS. 1 and 2, an injection molding apparatus is generally shown at 10. The injection molding apparatus 10 includes a manifold 12, which is spaced between a back plate 22 and a cavity mold plate 24. The manifold 12 is located relative to the cavity mold plate 24 by a locating ring 26. A sprue bushing 16 is coupled to an inlet 18 of the manifold 12. The sprue bushing 16 receives a melt stream of moldable material from a machine nozzle (not shown) and delivers the melt through inlet 18 to a manifold channel 14 of the manifold 12. The melt travels through the manifold channel 14 and exits the manifold 12 through manifold outlets 20. The manifold 12 is heated by manifold heaters 28, which communicate with a power source (not shown) through electrical connectors 30. The manifold heaters 28 are located between the manifold 12 and the back plate 22. The manifold heaters 28 shown are plate heaters, however, other suitable types of manifold heaters may alternatively be used.

Hot runner nozzles 32 are received in respective openings 34 in cavity mold plate 24. A nozzle melt channel 36 extends through each nozzle 32 and is in communication with the manifold outlet 20 to receive melt from the manifold channel 14. Nozzles 32 are heated by nozzle heaters 38, which communicate with a power source (not shown) though electrical connectors 39. The nozzle heaters 38 shown are heating elements embedded into an outer surface of the nozzles 32, however, other suitable types of nozzle heaters may alternatively be used. Each nozzle further includes a thermocouple 40 to provide temperature measurements therefore.

Valve pins 42 extend through the nozzle melt channels 36. Each valve pin 42 is slidable through a valve pin bushing 44, which is located between the manifold 12 and the nozzle 32, to selectively close a mold gate 46. Each valve pin bushing 44 includes a melt channel 45 that links the manifold channel outlet 20 with the nozzle melt channel 36. Actuators 48, which are received in the back plate 22 of the injection molding apparatus 10, actuate the valve pins 42. The actuators 48 may be any suitable type including pneumatic or hydraulic, for example.

A mold gate insert 50 is coupled to a forward end of each nozzle 32. Each mold gate insert 50 is threaded to the respective nozzle 32 and therefore may be easily removed for repair or replacement. The mold gate inserts 50 may alternatively be coupled to the nozzle 32 by another method such as brazing or soldering, for example. The mold gate inserts 50 are relatively easy to manufacture and install and are typically made of a conventional tool steel or stainless steel. Other suitable materials may alternatively be used provided that the materials are able to withstand thermal shock, which occurs as a result of the continuous cycling between extreme hot and cold temperatures.

Each mold gate insert 50 includes a recess 52 for receiving melt from the nozzle melt channel 36. Mold gates 46 extend through each mold gate insert 50 to allow melt to flow from the recess 52 into a mold cavity 56. Each mold gate 46 is located at an edge of the respective mold cavity 56. As shown in FIG. 2, each mold cavity 56 is delimited by the cavity mold plate 24, a portion of the mold gate insert 50 and a mold core 60, which projects from a mold plate 25. Cooling channels 58 cool the mold cavity 56.

It will be appreciated by a person skilled in the art that the shape of the mold cavity 56 is not limited by the mold gate insert 50. Mold gate inserts 50 having differently shaped mold cavity delimiting portions may be selected and installed in the injection molding apparatus 10 to suit a particular application.

Although only two hot runner nozzles 32 are shown, it will be appreciated that a typical injection molding apparatus includes a plurality of manifold outlets for delivering melt to a plurality of hot runner nozzles. Alternatively, another type of injection molding apparatus includes a single manifold outlet for delivering melt to a single hot runner nozzle. Further, it will be appreciated that although only a single mold cavity 56 is shown receiving melt from nozzle 32, a plurality of mold cavities 56 may receive melt from a single nozzle 32, as is well known in edge gating applications. In this case, the valve pin 42 would control melt flow through a plurality of mold gates 46 located around nozzle 32 simultaneously.

Figure 3:
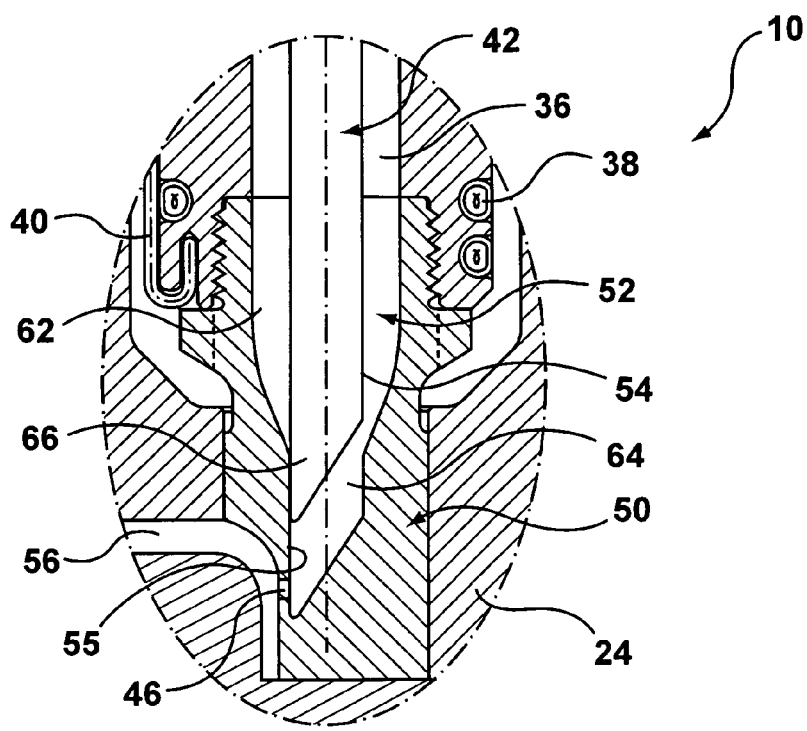
FIG. 3 is an enlarged side view of a portion of FIG. 2 showing a valve pin in a retracted position.
Figure 4:
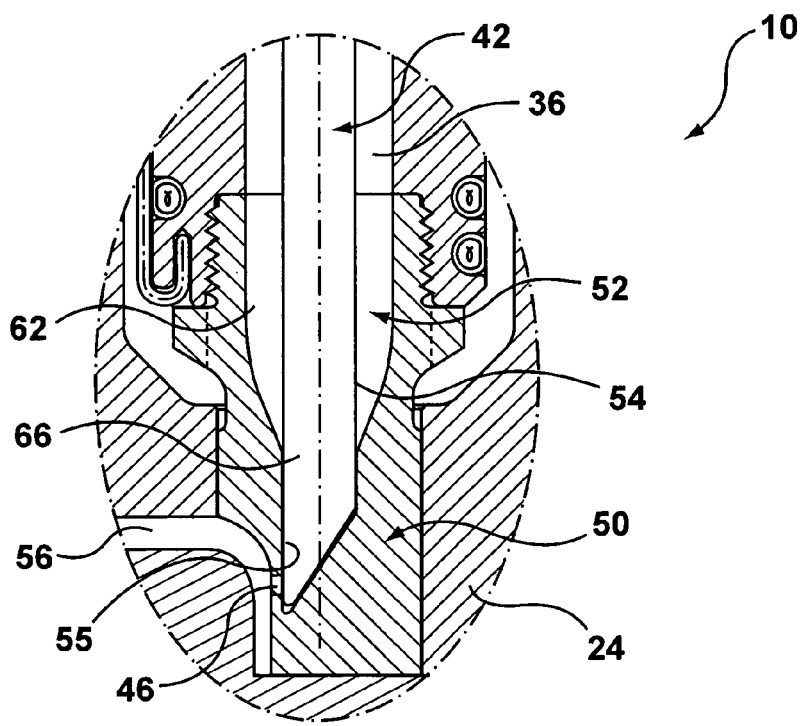
FIG. 4 is a view similar to FIG. 3 showing the valve pin in an extended position.

FIG. 3 shows the valve pin 42 in a retracted position in which the valve pin 42 extends through a first chamber 62 of the recess 52 and extends partway into a second chamber 64 of the recess 52. As shown, recess 52 tapers from a first diameter in the first chamber 62 that is aligned with the nozzle melt channel 36 to a second diameter in the second chamber 64 that is sized to receive the valve pin 42. The second chamber 64 is also shaped to receive an angled tip 66 of the valve pin 42. The valve pin 42 is movable from the retracted position of FIG. 3 to an extended position, which is shown in FIG. 4. In the extended position, an outer side surface 54 of the valve pin 42 abuts an inner wall 55 of the second chamber 64. In this position, mold gate 46 is blocked by valve pin side surface 54 so that melt flow from recess 52 into the mold cavity 56 is blocked.

The asymmetrical shape of the angled tip 66 helps to force melt out of the second chamber 64 of the recess 52 as the valve pin 42 moves toward the mold gate 46. By forcing the melt to evacuate, the occurrence of a dead spot at a forward end of the second chamber 64 is reduced. The angled tip 66 further exerts a directed sealing force toward the mold gate 46. It will be appreciated by a person skilled in the art that the angled tip 66 could be replaced with a tip that is either rounded, conical or flat in shape.

In operation, the valve pin 42 is moved to the retracted position and melt is injected into the manifold channel 14 from a machine nozzle (not shown), through the sprue bushing 16. The melt flows through manifold channel 14 and exits manifold 12 through manifold outlets 20. From the manifold outlets 20, the melt flows through melt channels 45 of the valve pin bushings 44 and into nozzle melt channels 36. The nozzle melt channels 36 deliver the melt to the mold cavities 56 through mold gates 46.

Once the mold cavities 56 have been filled with melt, valve pin 42 is moved from the retracted position of FIG. 3 into the extended position of FIG. 4. As valve pin 42 moves toward the mold gate 46, the angled tip 66 facilitates the evacuation of plastic from the second chamber 64 of the recess 52 and in the extended position, side surface 54 of valve pin 42 seals off the mold gate 46. The mold cavities 56 are then cooled, and valve pin 46 is moved to its retracted position, thereby shearing off the molded parts at respective mold gates 46. The molded parts are then ejected from the injection molding apparatus 10.

In the embodiment of FIGS. 1 and 2, the gate insert 50 forms part of the mold that surrounds the mold cavity 56. As a result, a witness mark is typically left on the molded part at the junction of the mold gate insert 50 and the mold plates 24, 25. Typically, this is not a concern for non-cosmetic injection molding applications.

Further embodiments are shown in FIGS. 5 to 17 in which like reference numerals indicate similar structure.

Figure 5:
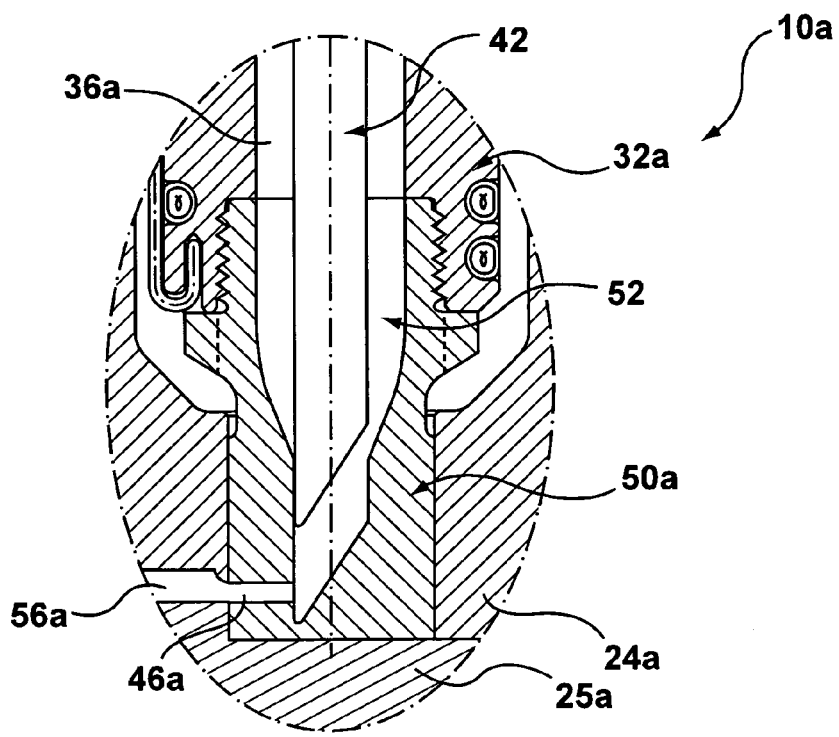
FIG. 5 is a side view of a portion of an injection molding apparatus according to another embodiment of the present invention in which a valve pin is shown in a retracted position.
Figure 6:
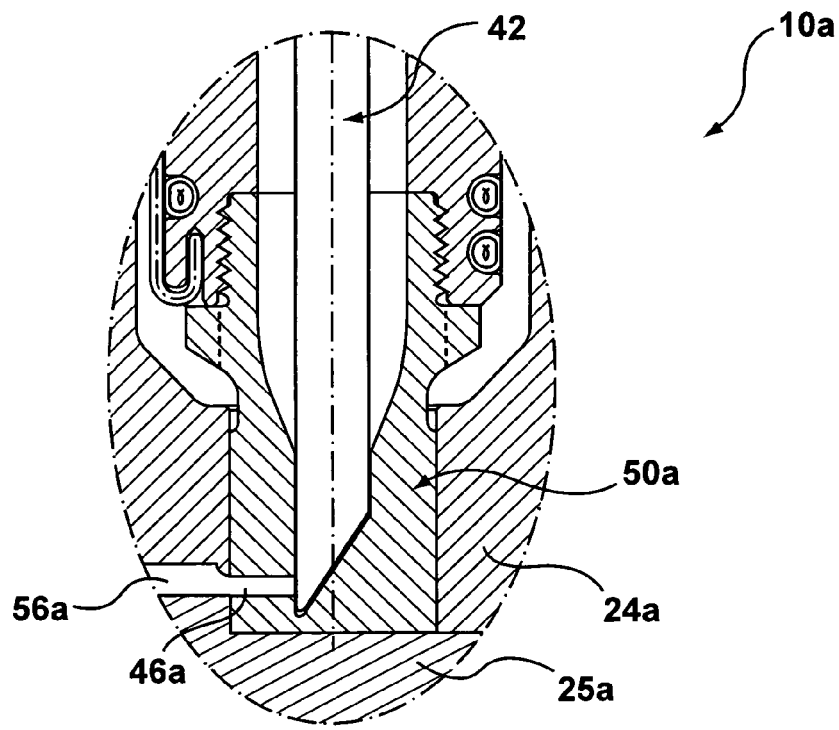
FIG. 6 is a view similar to FIG. 5 showing the valve pin in an extended position.

Referring to FIGS. 5 and 6, another embodiment of an injection molding apparatus 10a is shown in which witness marks are not left on the molded parts. In this embodiment, gate insert 50a does not form part of the mold surrounding a mold cavity 56a. Instead, the mold cavity 56a is located between cavity mold plate 24a and mold plate 25a. Mold gate 46a extends through the mold gate insert 50a to allow melt to flow from nozzle channel 36a of nozzle 32a into the mold cavity 56a. Operation of the apparatus 10a is similar to the previous embodiment and will not be described further here.

Figure 7:
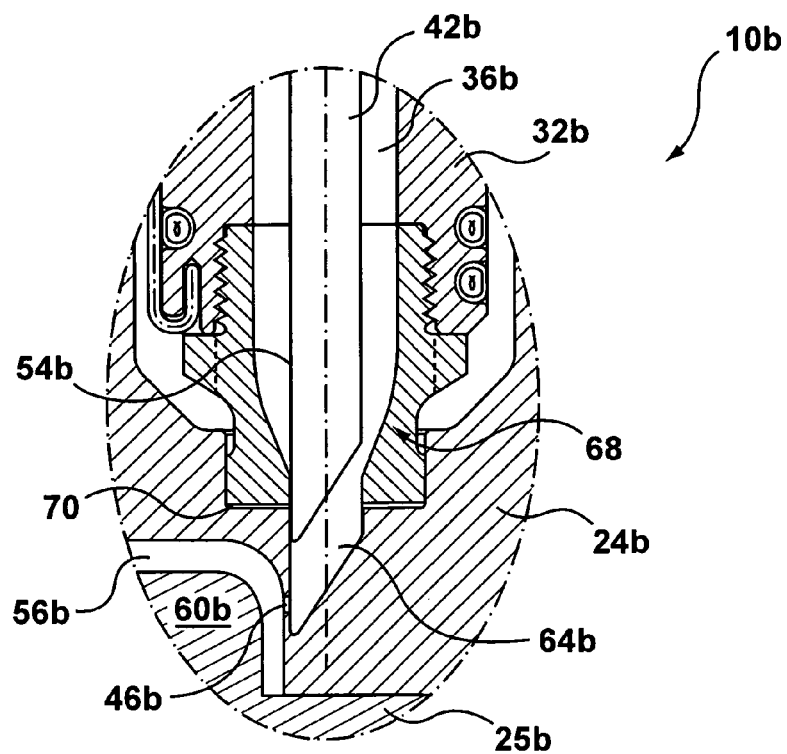
FIG. 7 is a side view of a portion of an injection molding apparatus according to another embodiment of the present invention in which a valve pin is shown in a retracted position.
Figure 8:
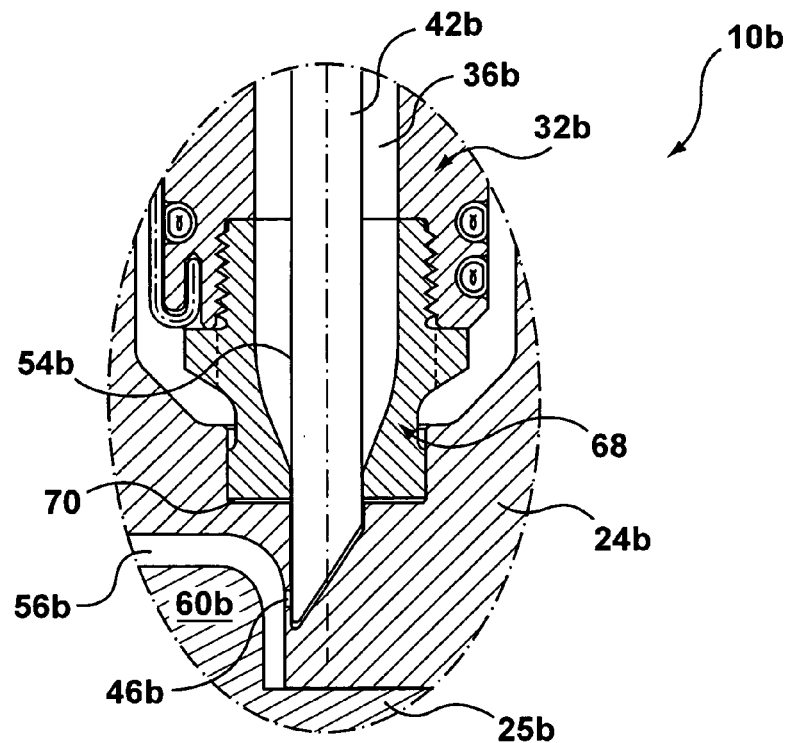
FIG. 8 is a view similar to FIG. 7 showing the valve pin in an extended position.

FIGS. 7 and 8 show another embodiment of an injection molding apparatus 10b, in which the mold gate insert 50 has been removed. Instead, a nozzle tip 68 is coupled to a forward end of a nozzle 32b. The nozzle tip 68 is threaded to the nozzle 32b, however, similar to the mold gate insert of the previous embodiments, nozzle tip 68 may alternatively be brazed or soldered thereto. A nozzle channel 36b extends through the nozzle 32b and the nozzle tip 68 and communicates with a mold cavity 56b through a mold gate 46b. The mold cavity 56b is delimited by a cavity mold plate 24b and a mold core 60b, which projects from a mold plate 25b. A valve pin 42b having a side surface 54b is slidable through the nozzle channel 36b, out of nozzle tip 68 and into second chamber 64b, which is located in cavity mold plate 24b. In this position, valve pin side surface 54b selectively seals off the mold gate 46b.

An air gap 70 is provided between the nozzle tip 68 and the cavity mold plate 24b, as shown, to insulate a forward end of the nozzle tip 68 from the cavity mold plate 24b. By including the air gap 70, the nozzle tip 68 is better able to retain heat because it is spaced from the mold gate 46b, which is subject to cyclical cooling. The nozzle tip 68 is typically made of conventional steel; however, the tip 68 may alternatively be made of an insulator such as titanium or ceramic, for example. Operation of the injection molding apparatus 10b is similar to the previous embodiments and will not be described further here.

Figure 9:
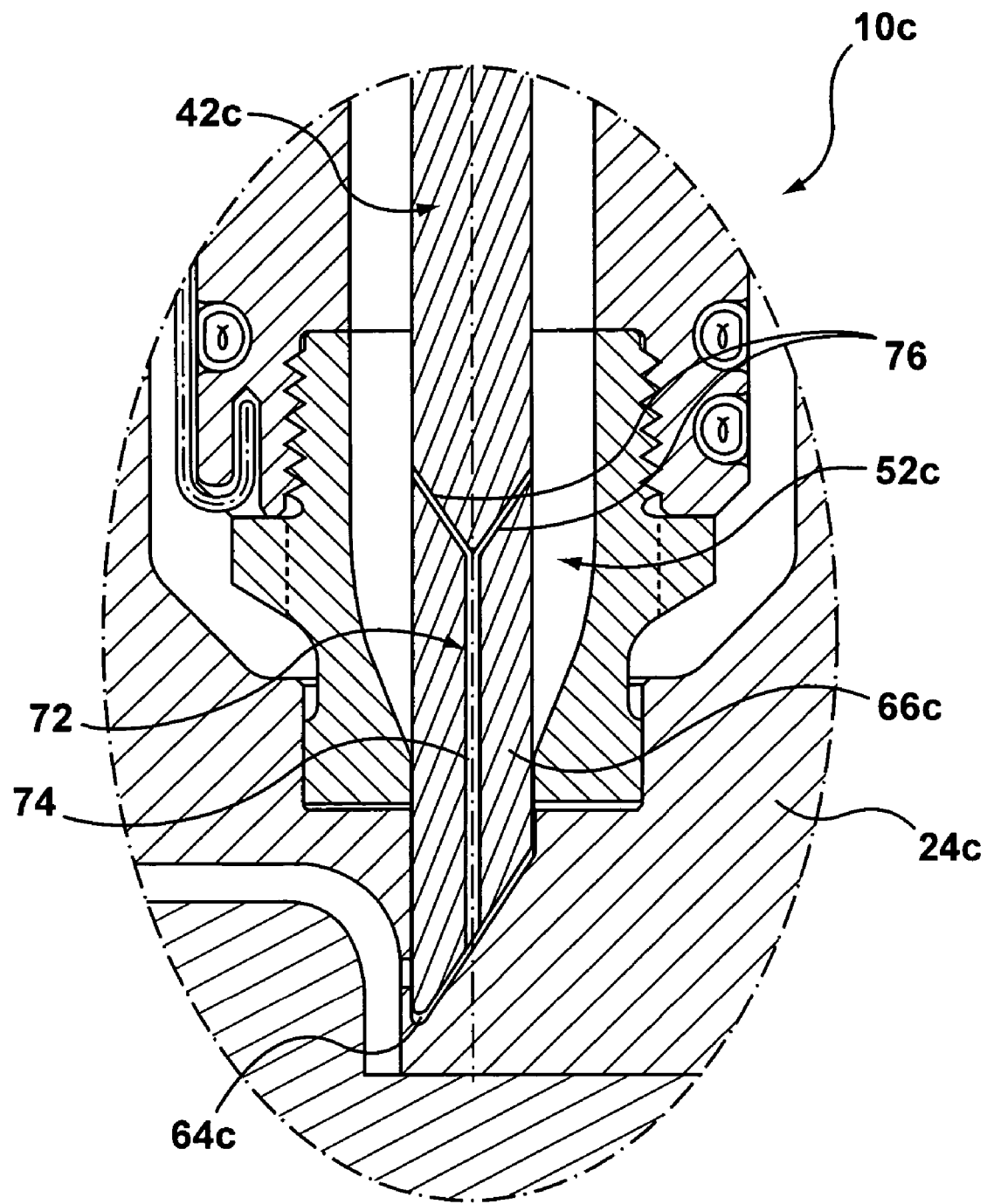
FIG. 9 is a side view of a portion of an injection molding apparatus according to another embodiment of the present invention in which a valve pin is shown in an extended position.

Referring to FIG. 9, another embodiment of an injection molding apparatus 10c is shown. This embodiment is similar to the embodiment of FIGS. 7 and 8, however, a flow back channel 72 is provided in a forward end of the valve pin 42c. Although only one flow back channel 72 is shown, a second flow back channel 72 may be provided on the opposite side of the valve pin 42c. The flow back channel 72 includes a primary channel 74 and a pair of secondary channels 76, which branch off the primary channel 74. The flow back channel 72 facilitates the removal of melt from a forward end of second chamber 64c, which is provided in cavity mold plate 24c. The flow back channel 72 provides a path for melt that is trapped forward of angled tip 66c to escape into recess 52c. The flow back channels 72 help to reduce the occurrence of dead spots forward of the valve pin 42c. Operation of the injection molding apparatus 10c is similar to the previous embodiments and will not be described further here.

In another embodiment, the flow back channel 72 is drilled into the forward end of the valve pin 42c. Primary channel 74 extends upwardly through the center of the valve pin 42c and secondary channels 76 branch outwardly toward the recess 52c. Similar to the previous embodiment, the flow back channel 72 helps to reduce the occurrence of dead spots forward of valve pin 42c. Further, the flow back channel 72 allows the valve pin 42c to move forward even if the melt in the mold gate 46c and mold cavity 56c have solidified.

Figure 10:
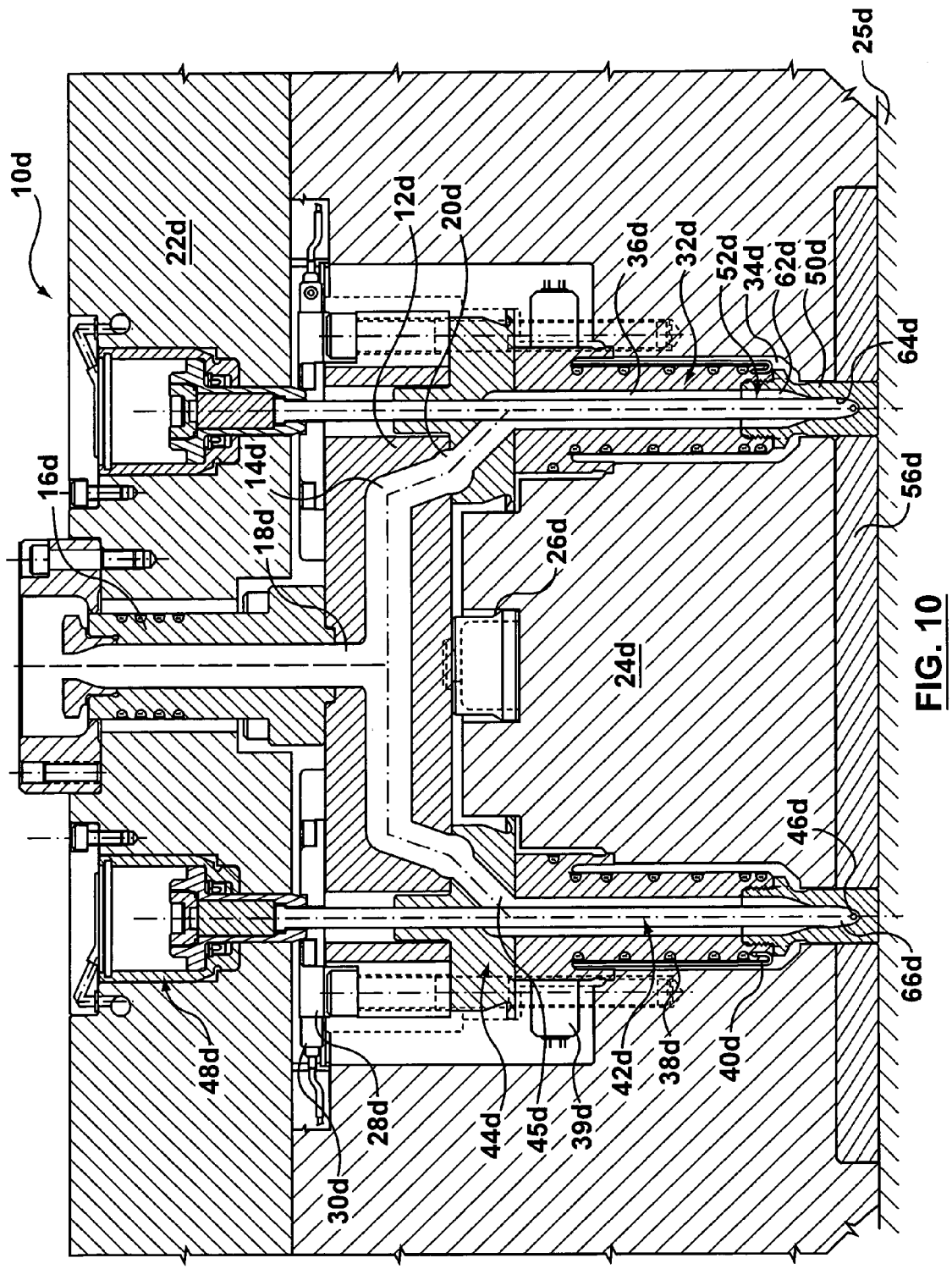
FIG. 10 is a front view partly in section of an injection molding apparatus according to another embodiment of the present invention.

Referring now to FIG. 10, another embodiment of an injection molding apparatus 10d is shown. The injection molding apparatus 10d includes a single mold cavity 56d, which receives melt from a pair of adjacent nozzles 32d. The injection molding apparatus 10d includes a manifold 12d, which is spaced between a back plate 22d and a cavity mold plate 24d. The manifold 12d is located relative to the cavity mold plate 24d by a locating ring 26d. A sprue bushing 16d is coupled to an inlet 18d of the manifold 12d. The sprue bushing 16d receives a melt stream of moldable material from a machine nozzle (not shown) and delivers the melt through inlet 18d to a manifold channel 14d of the manifold 12d. The melt travels through the manifold channel 14d and exits the manifold 12d through manifold outlets 20d. The manifold 12d is heated by manifold heaters 28d, which communicate with a power source (not shown) through electrical connectors 30d. The manifold heaters 28d are located between the manifold 12d and the back plate 22d.

The hot runner nozzles 32d are received in respective openings 34d in cavity mold plate 24d. A nozzle melt channel 36d extends through each nozzle 32d and is in communication with the manifold outlet 20d to receive melt from the manifold channel 14d. Nozzles 32d are heated by nozzle heaters 38d, which communicate with a power source (not shown) through electrical connectors 39d. Each nozzle further includes a thermocouple 40d to provide temperature measurements therefore.

Valve pins 42d having angled tips 66d, which are similar to the valve pins of the previous embodiments, extending through the nozzle melt channels 36d. Each valve pin 42d is slidable through a valve pin bushing 44d, which is located between the manifold 12d and the nozzle 32d, to selectively close a lateral mold gate 46d with a side surface thereof. Each valve pin bushing 44d includes a melt channel 45d that links the manifold channel outlet 20d with the nozzle melt channel 36d. Actuators 48d, which are received in the back plate 22d of the injection molding apparatus 10d, actuate the valve pins 42d. The actuators 48d may be any suitable type, e.g., pneumatic or hydraulic.

A mold gate insert 50d is coupled to a forward end of each nozzle 32d. Each mold gate insert 50d is threaded to the respective nozzle 32d and therefore may be easily removed for repair or replacement. The mold gate inserts 50d may alternatively be coupled to the nozzle 32d by another method such as brazing or soldering, for example. The mold gate inserts 50d are relatively easy to manufacture and install and are typically made of a conventional tool steel or stainless steel, however, any other suitable material may alternatively be used. The mold gate inserts 50d are subject to thermal shock in the injection molding apparatus, therefore the mold gate insert material must be able to withstand the molding conditions.

Each mold gate insert 50d includes a recess 52d having a first chamber 62d and a second chamber 64d for receiving melt from the nozzle melt channel 36d. Mold gates 46d extend through each mold gate insert 50d to allow melt to flow from the second chamber 64*d* of each recess 52*d* into the common mold cavity 56*d*. The mold cavity 56*d* is delimited by the cavity mold plate 24*d*, a portion of each mold gate insert 50*d* and a mold core (not shown), which extends from a mold plate 25*d*. The mold gates 46*d* are located along a common edge, i.e. side, of the mold cavity 56*d*. Cooling channels (not shown) cool the mold cavity 56*d*.

Although only two hot runner nozzles 32*d* are shown, it will be appreciated that more than two nozzles 32*d* may be provided to inject melt into the common mold cavity 56*d*.

Operation of the injection molding apparatus 10*d* in a simultaneous molding application will now be described. The valve pins 42*d* are moved to a retracted position, in which the angled tip 66*d* of each valve pin 42*d* is spaced from the gate 46*d* and melt is injected into the manifold channel 14*d* from a machine nozzle (not shown), through the sprue bushing 16*d*. The melt flows through the manifold channel 14*d* and exits the manifold 12*d* through manifold outlets 20*d*. From the manifold outlets 20*d*, the melt flows through the melt channels 45*d* of the valve pin bushings 44*d* and into the nozzle melt channels 36*d* of adjacent nozzles 32*d*. As shown in FIG. 11A, melt is delivered simultaneously from the nozzles 32*d* through the mold gates 46*d* and into the mold cavity 56*d*. A first flow front 78 and a second flow front 80 travel outwardly from the adjacent mold gates 46*d*. As a result of the simultaneous injection of melt into the mold cavity 56*d*, a flow line 82, which is shown in FIG. 11B, occurs generally midway between the adjacent mold gates 46*d*.

The flow line 82 tends to be a line of weakness in the molded part and typically has an undesirable appearance. Therefore, it is often desirable to select the location of the flow line 82 in the part or completely eliminate the flow line 82 from the part.

Referring to FIGS. 12A and 12B, operation of the injection molding apparatus 10*d* in a first sequential molding application will now be described. First, one of the valve pins 42*d* is moved to a fully retracted position (not shown), in which the angled tip 66*d* of the valve pin 42*d* is clear of the second portion 64*d* of the recess 52*d* of the mold gate insert 50*d*. Melt is then injected into the manifold channel 14*d* from a machine nozzle (not shown), through the sprue bushing 16*d*. The melt flows through the manifold channel 14*d* and exits the manifold 12*d* through manifold outlets 20*d*. From the manifold outlets 20*d*, the melt flows through the melt channels 45*d* of the valve pin bushings 44*d* and into the nozzle melt channels 36*d* of adjacent nozzles 32*d*. Because only one of the valve pins 42*d* is retracted, melt enters the mold cavity 56*d* from only one mold gate 46*b*, which is indicated as mold gate "A" in FIG. 12*a*. After a delay, the other valve pin 42*d* is retracted in order to allow melt to flow into the mold cavity 56*d* from the other mold gate 46*d*, which is indicated as mold gate "B" in FIG. 12B. This causes the flow line 82 to be located closer to mold gate B than mold gate A. It will be appreciated by persons skilled in the art that the delay between the opening of mold gate A the opening of mold gate B may be adjusted in order to adjust the location of the flow line 82.

Operation of the injection molding apparatus 10*d* in a second sequential molding application, in which the mold line is eliminated, will now be described with reference to FIGS. 13A and 13B. Similar to the first sequential molding operation, only one valve pin 42*d* is fully retracted initially to open one mold gate 46*b*, which is indicated as mold gate A in FIG. 13A. The mold cavity 56*d* is then filled until the flow front 78 from mold gate A has passed the other mold gate 46*d*, which is indicated as mold gate B in FIG. 13A. Once the flow front 78 is past mold gate B, mold gate B is opened by retracting the other valve pin 42*d*. Melt is then fed into the mold cavity 56*d* through both mold gates A and B until the mold cavity 56*d* is full.

Figure 14:
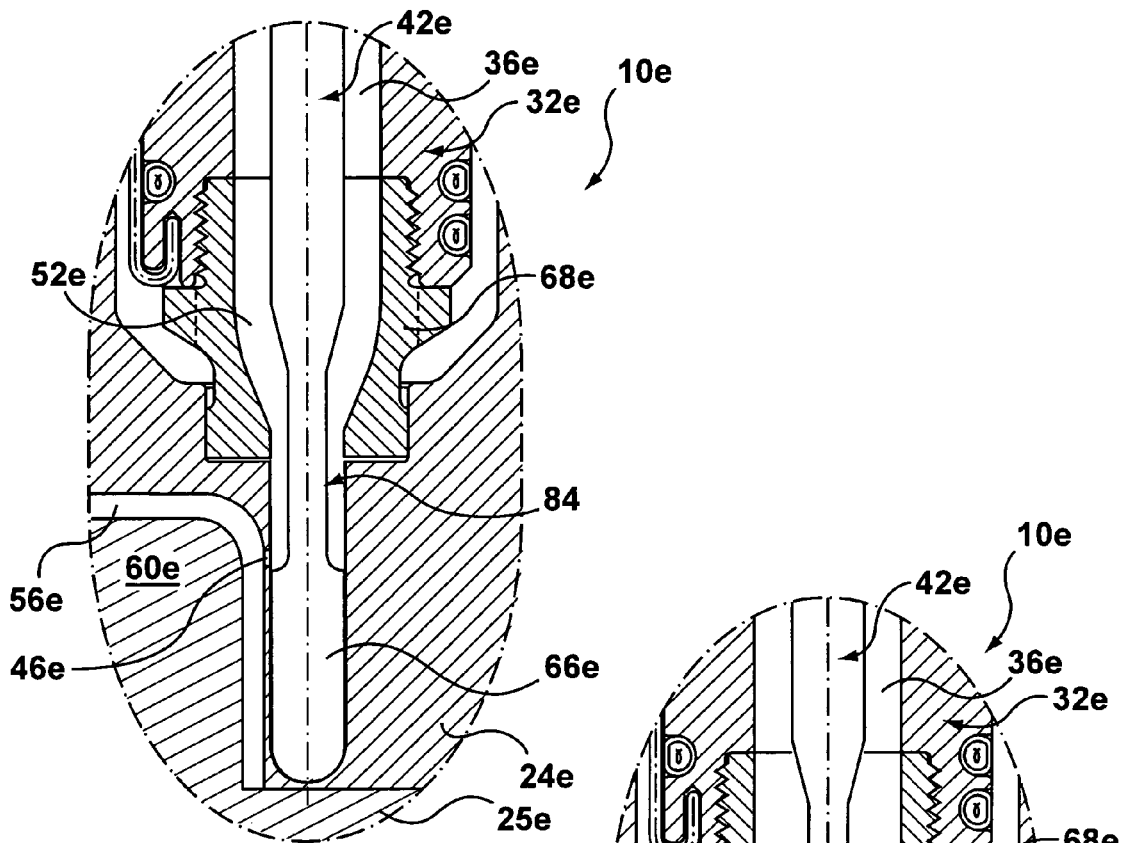
FIG. 14 is a side view of a portion of an injection molding apparatus according to another embodiment of the present invention in which a valve pin is shown in an extended position.
Figure 15:
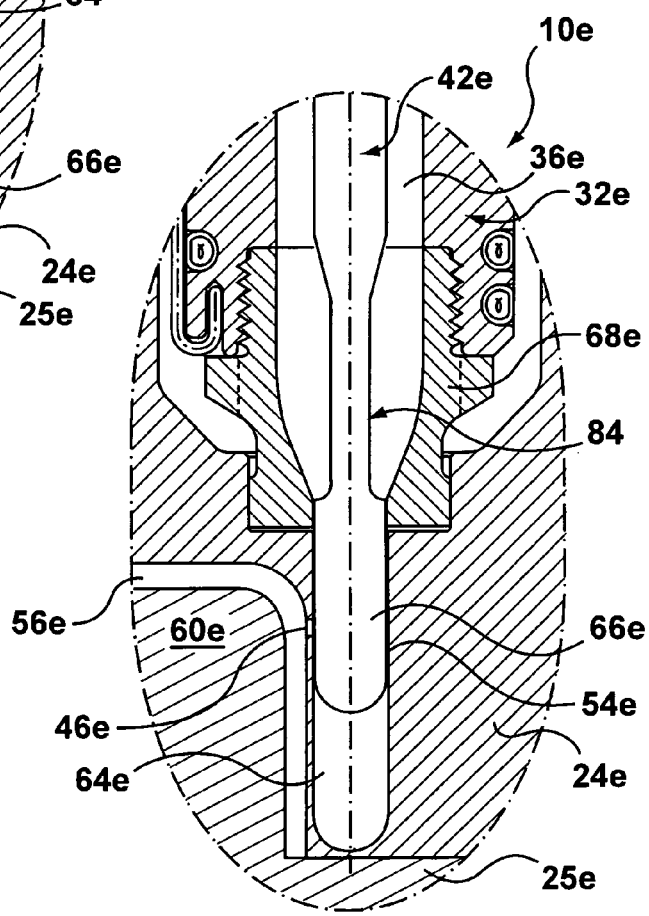
FIG. 15 is a view similar to FIG. 14 showing the valve pin in a retracted position.

Referring to FIGS. 14 and 15, another embodiment of an injection molding apparatus 10*e* is shown that is reverse gated. Accordingly, a valve pin 42*e* is retracted to close a mold gate 46*e* and extended to allow melt to flow through mold gate 46*e*. In this embodiment, valve pin 42*e* includes a reduced diameter portion 84 that is spaced upstream from a forward end of valve pin tip portion 66*e*. The valve pin 42*e* extends through a nozzle channel 36*e* of nozzle 32*e* and nozzle tip 68*e*, and into a second chamber 64*e*, which is formed in cavity mold plate 24*e*. Reduced diameter portion 84 receives the melt stream from recess 52*e* and directs it to mold cavity 56*e* via mold gate 46*e*. As mentioned, mold gate 46*e* is open when valve pin 42*e* is in an extended position with tip portion 66*e* seated in second chamber 64*e*, as shown in FIG. 14, and is closed when valve pin 42*e* is in a retracted position with tip portion 66*e* unseated from second chamber 64*e*, as shown in FIG. 15. As such, the melt stream does not flow within second chamber, i.e., recess forward portion, 64*e*. Mold cavity 56*e* is delimited by a cavity mold plate 24*e* and a mold core 60*e*, which projects from a mold plate 25*e*. In this embodiment, an outer side surface 54*e* of nozzle tip portion 66*e* closes mold gate 46*e* in a retracted pin position and shears off from the molded article when extended into the open pin position. Nozzle tip portion 66*e* is not shown as being angled in FIGS. 14 and 15. However, it will be appreciated that the tip 66*e* may be angled, if desired.

Figure 16:
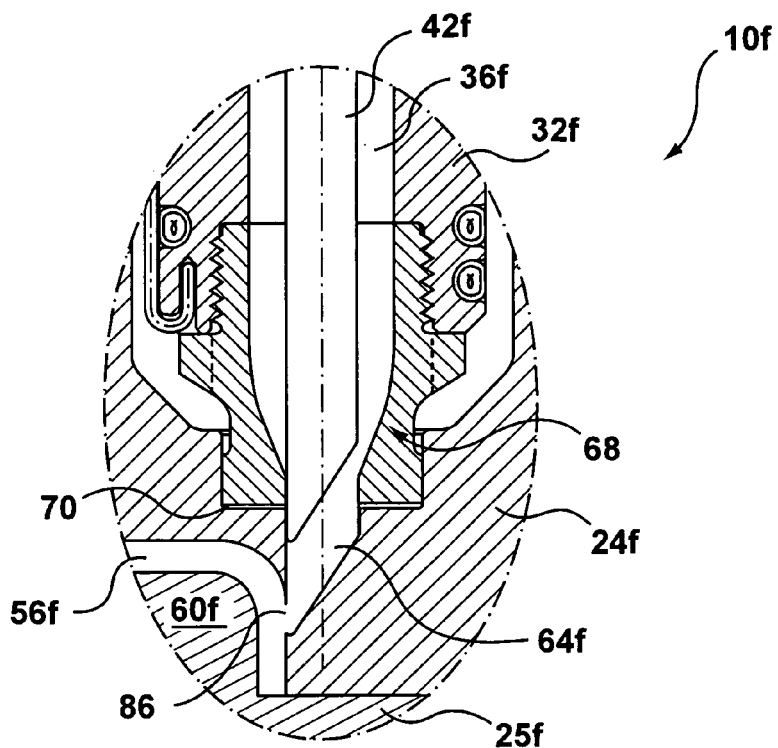
FIG. 16 is a side view of a portion of an injection molding apparatus according to another embodiment of the present invention in which a valve pin is shown in an extended position.
Figure 17:
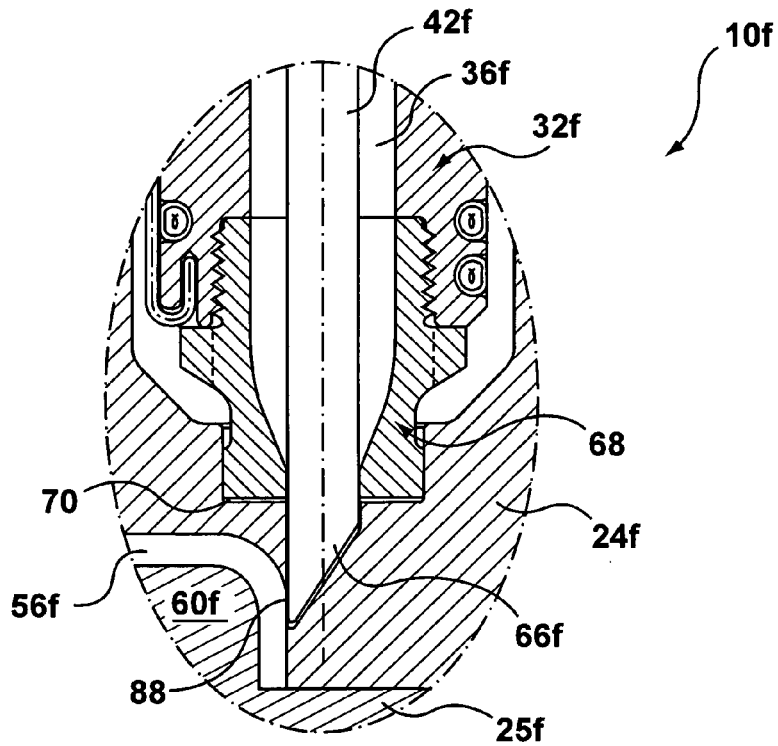
FIG. 17 is a view similar to FIG. 16 showing the valve pin in a retracted position.

Referring to FIGS. 16 and 17, another embodiment of an injection molding apparatus 10*f* is shown. The injection molding apparatus 10*f* includes a nozzle tip 68 and is similar to the embodiment of FIGS. 7 and 8. However in this embodiment, a valve pin 42*f* includes a molding surface 88 that closes opening 86 between mold cavity 56*f* and second chamber 64*f* to form a portion of mold cavity 56*f*. The valve pin 42*f* extends through nozzle channel 36*f*, nozzle tip 68, and into second chamber 64*f*. Opening 86 takes the place of a mold gate, such that melt in second chamber 64*f* flows directly into mold cavity 56*f* until valve pin 42*f* is advanced to an extended position, as shown in FIG. 17. In the extended position, molding surface 88 of valve pin 42*f* completes mold cavity 56*f*. Thus, mold cavity 56*f* is delimited by cavity mold plate 24*f*, mold core 60*f*, which projects from mold plate 25*f*, and valve pin molding surface 88. Once the molded article has cooled, valve pin 42*f* is retracted to the position shown in FIG. 16, which shears off the molded piece at opening 86 for ejection thereof from mold cavity 56*f*. Injection molding apparatus 10*f* may also be operated in accordance with the embodiment of FIGS. 14-15.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold having a manifold channel for receiving a melt stream of moldable material under pressure;
   a nozzle coupled to the manifold and having a nozzle melt channel for receiving the melt stream from the manifold channel;

a mold cavity in fluid communication with the nozzle melt channel for receiving the melt stream through a mold gate, the mold gate being located along an edge of the mold cavity;

a recess for receiving the melt stream from the nozzle channel and for fluidly communicating the melt stream to the mold cavity through the mold gate, the recess having a forward portion that at least partially extends forward of the mold gate; and a valve pin having a tip portion, wherein the valve pin is slidable within the nozzle channel from a retracted position in which the mold gate is open and the valve pin tip portion is unseated from the recess forward portion to an extended position in which an outer side surface of the valve pin blocks the mold gate and the valve pin tip portion is seated in the recess forward portion.

2. The injection molding apparatus of claim 1, wherein the valve pin includes an angled tip.

3. The injection molding apparatus of claim 2, wherein the forward portion of the recess is shaped to receive the angled tip.

4. The injection molding apparatus of claim 3, wherein the forward portion of the recess has a reduced diameter from an upstream portion of the recess.

5. The injection molding apparatus of claim 1, further comprising:
a mold gate insert coupled to a forward end of the nozzle, wherein the recess is formed in the mold gate insert.

6. The injection molding apparatus of claim 5, wherein the mold gate extends through the mold gate insert.

7. The injection molding apparatus of claim 5, wherein a portion of the mold gate insert delimits the mold cavity.

8. The injection molding apparatus of claim 1, wherein at least at least the forward portion of the recess is formed in a cavity mold plate.

9. The injection molding apparatus of claim 8, wherein the cavity mold plate at least partially delimits the mold cavity.

10. The injection molding apparatus of claim 2, further comprising:
at least one flow back channel provided in the angled tip of the valve pin.

11. An injection molding apparatus comprising:
a manifold having a manifold channel for receiving a melt stream of moldable material under pressure;

a nozzle coupled to the manifold and having a nozzle melt channel for receiving the melt stream from the manifold channel;

a mold cavity in fluid communication with the nozzle melt channel for receiving the melt stream through a mold gate, the mold gate being located along an edge of the mold cavity; and a valve pin having a reduced outer diameter portion having a first diameter and a tip having a second diameter larger than the first diameter, wherein the valve pin is slidable within the nozzle channel from a retracted position in which a side surface of the valve pin tip closes the mold gate to an extended open position in which the reduced outer diameter portion of the valve pin is disposed adjacent said mold gate to fluidly communicate the melt stream from the nozzle melt channel to the mold gate, such that at least a portion of the valve pin tip is seated within a chamber located forward of the mold gate.

12. The injection molding apparatus of claim 11, wherein the forward chamber is formed in a cavity mold plate.

13. The injection molding apparatus of claim 11, wherein the forward chamber is formed in a mold gate insert.

14. An injection molding apparatus comprising:
a manifold having a manifold channel for receiving a melt stream of moldable material under pressure;

a nozzle coupled to the manifold and having a nozzle melt channel for receiving the melt stream from the manifold channel;

a mold cavity in fluid communication with the nozzle melt channel for receiving the melt stream; and a valve pin slidable within the nozzle channel from a retracted open position to an extended closed position, wherein the valve pin includes a tip portion having a forward most surface and an adjacent side surface that forms a portion of the mold cavity when the valve pin is in the extended closed position, and wherein the melt stream flows downstream of the forward most surface of the tip portion of the valve pin when the valve pin is in the retracted open position.

15. The injection molding apparatus of claim 14, wherein the valve pin includes an angled tip.

* * * * *